United States Patent [19]

Gritz et al.

[11] Patent Number: 5,013,605
[45] Date of Patent: May 7, 1991

[54] CORDIERITE-TYPE GLASS-CERAMIC WITH CONTROLLED COLORATION

[76] Inventors: David N. Gritz, 163 Hilton Dr.; Herbert A. Miska, 1129 Park Ter., both of Horseheads, N.Y. 14845

[21] Appl. No.: 230,864

[22] Filed: Aug. 11, 1988

[51] Int. Cl.$^5$ ............................................. C03B 32/00
[52] U.S. Cl. ................................. 428/410; 428/210; 428/212; 428/220; 428/319.1; 428/325; 428/426; 428/428; 428/688; 428/699; 428/701; 428/702; 501/4; 501/9; 501/69
[58] Field of Search ............... 428/688, 689, 699, 700, 428/701, 702, 426, 428, 432, 206, 220, 212, 323, 331, 325, 210, 319.1, 312.6, 304.4, 410; 501/4, 9, 69

[56] References Cited

U.S. PATENT DOCUMENTS

| | | | |
|---|---|---|---|
| 2,920,971 | 1/1960 | Stookey | 501/9 |
| 3,231,399 | 1/1966 | Stookey | 501/4 |
| 3,282,711 | 11/1966 | Lin | 501/9 |
| 3,490,888 | 1/1970 | Strong | 501/4 |
| 3,585,054 | 6/1971 | Karstatter | 501/4 |
| 3,637,425 | 1/1972 | McMillan et al. | 428/701 X |
| 3,940,255 | 2/1976 | Harrington et al. | 501/9 |
| 3,958,052 | 5/1976 | Galusha et al. | 428/410 |
| 3,958,058 | 5/1976 | Elmer | 501/69 |
| 3,962,514 | 6/1976 | Rittler | 428/701 X |
| 4,084,974 | 4/1978 | Beall et al. | 501/4 |
| 4,221,047 | 9/1980 | Narken et al. | 29/840 X |
| 4,227,300 | 10/1980 | Anders et al. | 29/840 X |
| 4,304,603 | 12/1981 | Grossman et al. | 501/9 |
| 4,461,839 | 7/1984 | Rittler | 501/4 |
| 4,464,475 | 8/1984 | Beall et al. | 501/9 |
| 4,465,727 | 8/1984 | Fiijita et al. | 428/701 X |
| 4,595,665 | 6/1985 | Takayama et al. | 428/701 X |
| 4,613,549 | 9/1986 | Tanaka | 428/701 X |
| 4,687,749 | 8/1987 | Beall | 501/4 |
| 4,764,486 | 8/1988 | Ishihara et al. | 501/69 |
| 4,788,046 | 11/1988 | Barringer et al. | 264/60 X |

*Primary Examiner*—Ellis P. Robinson
*Assistant Examiner*—Archene A. Turner

[57] ABSTRACT

There is disclosed a cordierite-type glass-ceramic article having a controlled gray coloration, and a method of producing such article by employing titania as the nucleating agent and firing in a reducing atmosphere, preferably a hydrogen-containing atmosphere, at 500°–900° C. for 2–8 hours.

5 Claims, No Drawings

CORDIERITE-TYPE GLASS-CERAMIC WITH CONTROLLED COLORATION

FIELD OF THE INVENTION

The present invention relates, broadly, to glass-ceramic materials composed primarily of magnesia, alumina, silica and titania as a nucleating agent, and having cordierite as a primary crystal phase. It is particularly concerned with a method of treating such materials to provide a controlled, neutral or gray coloration in at least the material surface.

BACKGROUND OF THE INVENTION

U.S. Pat. No. 2,920,971 (Stookey) is the basic patent in the field of glass-ceramics. That patent discloses the production of glass-ceramic articles as the controlled crystallization of precursor glass articles by a carefully-defined heat treatment. Thus, a glass-ceramic article is produced by three basic steps: first, a properly formulated glass batch is melted; second, the glass melt is simultaneously cooled to a temperature at least below the glass transformation range and a glass body of desired shape formed; third, the glass body is subjected to a predetermined heat treatment to cause the glass to crystallize in situ.

One of the early commercial products that evolved from the glass-ceramic field was radomes for radar guided missiles. For about 30 years, Corning Glass Works, Corning, N.Y. has manufactured radomes from a glass-ceramic material marketed as Corning Code 9606. That product is highly crystalline with cordierite ($2MgO.2Al_2O_3.5SiO_2$) constituting the predominant crystal phase. Minor amounts of cristobalite (a polymorph of $SiO_2$), rutile ($TiO_2$), and a phase until recently believed to be magnesium dititanate ($MgO.2TiO_2$) are present also. An approximate analysis of the material, expressed in weight percent on the oxide basis, is reported below:

| | |
|---|---|
| $SiO_2$ | 56.1 |
| $Al_2O_3$ | 19.7 |
| $MgO$ | 14.9 |
| $As_2O_3$ | 0.4 |
| $TiO_2$ | 8.9 |

To be useful as a radome, a material must comply with a complex matrix of mechanical, electrical, thermal, and forming properties. Among these are dielectric constant, loss tangent and modulus of rupture. The dielectric constant affects the velocity of radiation passing through the wall of a radome. The loss tangent defines the quantity of energy absorbed by a material from radiation passing through the material. Thus, high dielectric constants and loss tangents limit the range, and hence utility, of a radome. High mechanical strength is an obvious requirement in view of the vibration and other stresses involved in launching and flight.

In one particular specification, the dielectric constant must not exceed 5.55, the loss tangent maximum is 0.0003 and the modulus of rupture (M.O.R.) should be at least 20,000 psi. The Code 9606 material meets these requirements. It is obvious, of course, that any permissible further treatment of the material must not appreciably degrade these properties.

In order to improve the mechanical strength of a radome, the article, after grinding to a proper prescription, may be subjected to what has been termed a fortification treatment. That treatment comprises subjecting the glass-ceramic to a sequential base-acid leaching process. Thus, the radome is initially contacted with (normally immersed into) an alkaline solution and thereafter, after removing the alkaline solution, it is contacted with (immersed into) an acid solution. That series of steps may be repeated several times in order to achieve the desired effect. As a matter of convenience and economics, a boiling aqueous NaOH solution has constituted the alkaline environment and an aqueous, room temperature $H_2SO_4$ solution has provided the acid conditions. The base and acid were customarily removed via rinsing in tap water.

The improvement in strength is deemed to result via healing surface flaws in the body. This phenomenon is due to the cristobalite being leached out of the microstructure (cristobalite is several times more quickly dissolved in hot NaOH solution than is cordierite). The acid acts upon the little residual glass left in the glass-ceramic body. After fortification, Corning Code 9606 demonstrates an enhanced modulus of rupture.

In general, glass-ceramic articles containing cordierite as the predominant crystal phase, but with little or no cristobalite, will demonstrate mechanical strengths, as defined through modulus of rupture measurements, of less than 20,000 psi. In contrast, those cordierite-containing articles with a minor, but significant, amount of cristobalite will evidence modulus of rupture measurements in excess of 30,000 psi after fortification. X-ray diffraction analysis and electron microscopy have indicated that Corning Code 9606 contains about 10% by volume cristobalite.

PURPOSE OF THE INVENTION

The glass-ceramic materials heretofore employed in radomes, such as Code 9606, have provided quite adequate mechanical and electrical properties. However, it has recently been proposed that a neutral or gray coloration would be desirable to minimize visibility and thus camouflage the article. Unfortunately, the fortification process bleaches the color to a bright white.

It is then a basic purpose of the invention to provide a controlled gray color in a cordierite-type glass-ceramic material.

Another purpose is to provide such controlled color in a fortified material.

A further purpose is to provide a practical method of producing such controlled color in a cordierite-type glass-ceramic.

A further purpose is to provide a method of producing color in a cordierite-type glass-ceramic that does not require special additives in the initial glass composition.

Another purpose is to develop color in a cordierite-type glass-ceramic without appreciably altering other properties of the material.

PRIOR LITERATURE

In addition to the Stookey patent already mentioned, particular attention is directed to U.S. Pat. No. 4,304,603 (Grossman et al.) which discloses cordierite-type glass-ceramics of lower thermal coefficient of expansion for radome use. The content of both patents is incorporated herein by reference.

Reference may also be made to the following United States Patents:

U.S. Pat. No. 3,170,780 (Takehara et al.) discloses using zinc sulfide (ZnS) as a nucleating agent for an $MgO—Al_2O_3—SiO_2$ glass. The glass is melted in a reducing atmosphere to preserve the ZnS. The color may be gray, chocolate, or black depending on iron and zinc sulfide contents.

U.S. Pat. No. 4,084,974 (Beall et al.) discloses a beta-spodumene or beta-quartz glass-ceramic exhibiting a blue-to-black color. The glass-ceramic is produced by adding a reducing agent, such as starch or sugar, to a lithia-alumina-silica glass batch containing $TiO_2$ to partially reduce $Ti^{+4}$ ions to $Ti^{+3}$ ions U.S. Pat. No. 4,461,839 (Rittler) discloses beta-quartz and beta-spodumene glass-ceramics that are prepared from glasses that are free of MgO and contain 0.05–0.2% $Fe_2O_3$, 2.5–6% $TiO_2$ and two oxides from the group CaO, $CeO_2$, NiO, SnO, $V_2O_5$ and $WO_3$. The patent teaches that iron and titanium oxides react to reduce the titanium ion, and that an unattractive gray-brown color is produced unless MgO is omitted.

SUMMARY OF THE INVENTION

The method embodiment of our invention is a method of producing a cordierite-type glass-ceramic having a controlled gray coloration which comprises:
a. formulating, melting and forming a glass article from a composition composed essentially of MgO, $Al_2O_3$ and $SiO_2$ and containing $TiO_2$ as a nucleating agent;
b. heat treating the glass article to convert the glass in situ to a glass-ceramic in which cordierite is the primary crystal phase; and
c. firing the glass-ceramic article in a reducing atmosphere, preferably a hydrogen-containing atmosphere, at a temperature in the range of 500–900° C., preferably 500°–800° C., for a time of 2–8 hours.

The invention further contemplates the material and articles produced by the method.

GENERAL DESCRIPTION OF THE INVENTION

The present invention is generally applicable to all cordierite-type glass-ceramics. Hence, the formulation of a base glass composition suitable for crystallization for any particular purpose will be dependent on the properties required for that purpose, and may be determined by reference to available information. For example, the Stookey and Grossman et al. patents each disclose several cordierite-type glass-ceramics, as well as melting procedures and thermal treatments and the properties of the resultant materials.

In general, a base composition is essentially magnesia, alumina and silica. The single requirement for present purposes is that titania be employed as the nucleating agent, preferably in an amount of 5–15%. Other oxides may be present for specific purposes, but are limited in amount so as not to create unwanted crystal phases.

The primary crystal phase is cordierite. However, cristobalite and titania crystals may also be present. As the Grossman et al. patent discloses, the presence of cristobalite up to 10% or so is desirable if the material is to be fortified. To this end, we prefer to employ a glass-ceramic having a composition consisting essentially, as calculated in percent by weight for an oxide basis, of 14–18% MgO, 18–26% $Al_2O_3$, 48–58% $SiO_2$, 8.5–11.5% $TiO_2$ and 0–1% $As_2O_3$.

Once a suitable glass is formulated, melted and formed to desired shape, the article is heat treated to cause crystallization. Usually, this involves holding the article within a defined temperature range to cause nuclei to form. The nucleated glass is then heated within a crystallizing thermal zone, usually a somewhat higher temperature range than used for nucleation.

The resultant cordierite-type glass-ceramic tends to have a rather light gray color. However, when the material is fortified, it bleaches to a bright white color.

Our invention is founded on the discovery that, if a cordierite-type glass-ceramic is nucleated with titania, preferably on the order of 8.5–11.5% by weight, a controlled gray color can be imparted by firing in a reducing atmosphere, in particular a hydrogen-containing atmosphere. The color obtained may vary from a light gray to a very dark or dense gray that appears almost black.

Color intensity increases as the time and temperature of the thermal cycle of the reduction treatment increases. Thus, we contemplate temperatures from 500° to 900° C. and times from two to eight hours. More severe thermal conditions tend to impair other properties, and we prefer to employ temperatures in the range of 500° C. to 800° C.

The atmosphere employed may be 100% hydrogen, but that is not necessary. We have found that forming gas (92% nitrogen-8% hydrogen) provides quite satisfactory reduction, and is convenient to use. However, lesser concentrations of hydrogen, on the order of 4 to 5%, have been employed, although somewhat longer exposure may be necessary to obtain equivalent color. Accordingly, it is believed a cracked ammonia atmosphere might be employed if available.

The firing must be at a temperature of about 500° C. for at least two hours to have any appreciable effect. The darkness of the color is enhanced with higher temperatures and longer times, which may be as high as 900° C. and as long as eight hours.

SPECIFIC DESCRIPTION OF THE INVENTION

An experiment was conducted to determine the optimum time-temperature conditions and process order for use in imparting coloration to Corning Code 9606 test pieces in accordance with the invention. Hold temperatures between and including 500° C. and 800° C., and hold times of two, five and eight hours, were employed. All firing was in a forming gas (92% $N_2$–8% $H_2$) atmosphere. Half of the samples were fired and then fortified. The other half were fortified first and then fired. Modulus of rupture, dielectric constant, and loss tangent measurements were made to determine the effect of the processing on properties.

Two different types of test pieces, modulus of rupture (MOR) bars 0.375"×0.188"×4.438" long and discs 1.000" diameter by 0.495" thick for dielectric constant and loss tangent measurements, were prepared for firing and testing. Eighty discs were used with one half being processed in a fired/fortified sequence, and the other half in a reverse sequence, that is, fortified/fired. Likewise, half of the over one hundred MOR bars, used in the various time/temperature cycles explored, were fired/fortified and the other half fortified/fired.

The samples were fired in a four inch diameter, insulated alumina tube with forming gas flowing through the tube. Furnace temperature was raised at 150° C. per hour and allowed to cool at furnace rate. An interval of six hours was required to cool from 800° C. to 250° C.

The fortification process consisted of a twenty minute immersion in a caustic bath (NaOH) at 100° C.; a five minute immersion in a water bath; a ten minute immersion in an acid bath (H₂SO₄); and a five minute immersion in a water bath. The latter three baths were at room temperature. Samples were fired in eight different time/temperature combinations with hold temperatures selected from the span of 500° C. to 800° C. and times being two, five and eight hours. Each run included three or four MOR bars and two or three dielectric discs.

MOR bars were tested using four point loading with a support span of 3.5" and a load span of one inch. While dielectric samples were fired at each time/temperature cycle, dielectric constant and loss tangent were only measured on test pieces fired eight hours at 800° C. When no appreciable change was noted with these most severe conditions, it was concluded that no change could be expected under less severe conditions.

TABLE 1

| Treatment | Temp. (°C.) | Time (hours) |
|---|---|---|
| A | 500 | 8 |
| B | 575 | 5 |
| C | 650 | 2 |
| D | 650 | 5 |
| E | 650 | 8 |
| F | 725 | 5 |
| G | 800 | 2 |
| H | 800 | 8 |

MOR values for six unfired and unfortified control bars ranged from 28600 to 30100 psi with an average value of 29300. Values for six fortified and unfired control bars ranged from 29700 to 31900 with an average value of 31100.

TABLE 2 shows the average MOR value for each different time/temperature firing schedule. The initial column of values are for fired/fortified test pieces. The last column of values shows the same data for fortified/fired sequence test pieces. The schedules are identified by letter as in TABLE 1.

TABLE 2

| Treatment | Avg. MOR (psi) Fired/Fortified | Avg. MOR (psi) Fortified/Fired |
|---|---|---|
| A | 30,300 | 31,700 |
| B | 31,000 | 31,500 |
| C | 30,600 | 31,400 |
| D | 30,800 | 31,000 |
| E | 30,250 | 29,750 |
| F | 31,000 | 28,200 |
| G | 31,600 | 28,700 |
| H | 31,600 | 27,800 |

It is evident that the fortified/fired samples have slightly higher MOR values with low temperature firing (500°–650° C.). However, the MOR for such samples drops off markedly at higher temperatures, whereas the fired/fortified test pieces provide consistent MOR values over the entire processing range.

TABLE 3 presents dielectric constant (DC) and loss tangent (LT) values measured on ten test pieces which were given three different treatments, the time/temperature firing schedule in each instance being eight hours and 800° C. The measurements were made at 25° C. and 8.6 GHz.

TABLE 3

| Treatment | DC | LT |
|---|---|---|
| None | 5.51 | .00024 |
| None | 5.48 | .00026 |
| None | 5.50 | .00026 |
| None | 5.53 | .00026 |
| Fired/Fort. | 5.48 | .00024 |
| Fired/Fort. | 5.53 | .00018 |
| Fired/Fort. | 5.48 | .00027 |
| Fort./Fired | 5.56 | .00023 |
| Fort./Fired | 5.49 | .00021 |
| Fort./Fired | 5.53 | .00021 |

It is evident that processing, within the stated conditions, has no adverse effect on dielectric properties.

Colors obtained from the different treatments ranged from light to medium gray. The Kruskal-Wallis, rank sums, distribution-free test indicated a significant difference among the eight treatments with apparently three levels of "graying" performance. Treatments F, G and H provided the darkest gray; treatments A and B the lightest; and C, D and E an intermediate. The darkest color, a medium neutral gray, was obtained with fired/fortified test pieces given treatments F, G or H.

The effect of firing at temperatures above 800° C. is shown by measurements on unfortified test pieces fired at 700° C. and 900° C. for eight hours. Dielectric properties were measured at 8.6 GHz and 25° C., and MOR values were measured by four point loading as before. The values observed are shown in TABLE 4.

TABLE 4

| Temp. (°C.) | DC | LT | MOR (psi) |
|---|---|---|---|
| 900 | 5.61 | .00039 | 15,900 |
| 900 | 5.72 | .00051 | 14,800 |
| 900 | 5.60 | .00046 | 16,100 |
| 700 | 5.49 | .00025 | 26,500 |
| 700 | 5.50 | .00024 | 21,200 |
| 700 | 5.51 | .00025 | 25,800 |

It is evident that firing above 800° C. is detrimental to mechanical and dielectric properties. Hence, such higher temperatures may be used only if other properties are not relevant. The MOR values for the 700° C. firing are lower than values shown in TABLE 2 since these test pieces were not fortified.

We claim:

1. A glass-ceramic article composed essentially of MgO, Al₂O₃, SiO₂ and TiO₂ as a nucleating agent, having a primary crystalline phase of cordierite and a secondary phase of cristobalite, a surface layer on the article having a substantially diminished cristobalite content, and the article having a gray coloration.

2. An article in accordance with claim 1 wherein the glass-ceramic article has a modulus of rupture that is at least about 30,000 psi, a dielectric constant that does not exceed about 5.55 and a loss tangent that does not exceed about 0.0003.

3. An article in accordance with claim 1 wherein the glass-ceramic article has a composition that is composed of approximately 56.1% SiO₂, 19.7 Al₂O₃, 14.9% MgO, 8.9% TiO₂ and 0.4% As₂O₃.

4. An article in accordance with claim 1 wherein the content of TiO₂ is 5–15%.

5. An article in accordance with claim 1 wherein the secondary phase of cristobalite is up to 10% of the total crystalline content.

* * * * *

UNITED STATES PATENT AND TRADEMARK OFFICE
CERTIFICATE OF CORRECTION

PATENT NO. : 5,013,605
DATED : May 7, 1991
INVENTOR(S) : David N. Gritz and Herbert A. Miska It is certified that error appears in the above-identified patent and that said Letters Patent is hereby corrected as shown below:

Col. 3, line 12 insert "." after "$Ti^{+3}$ ions"

Col. 5, line 18 insert "TABLE 1 below shows the eight temperature/time hold combinations that characterized the test runs."

Col. 6, line 62 insert a space between "$TiO_2$" and "is"

Signed and Sealed this

Fourth Day of May, 1993

Attest:

MICHAEL K. KIRK

Attesting Officer

Acting Commissioner of Patents and Trademarks